(12) United States Patent
Stegmaier et al.

(10) Patent No.: US 11,080,477 B2
(45) Date of Patent: Aug. 3, 2021

(54) FORM-BASED FORMULA EDITING IN SPREADSHEETS

(71) Applicant: Microsoft Technology Licensing, LLC, Redmond, WA (US)

(72) Inventors: Andrew William Stegmaier, Seattle, WA (US); Johnny Campbell, Woodinville, WA (US); Joseph John McDaid, Seattle, WA (US); Christian Canton, Bellevue, WA (US); Vikas Yadav, Seattle, WA (US); Sjoerd Roelof de Jong, Cambridge (GB); Robert David Ohn Tinn, Cambridge (GB); Marc Manuel Johannes Brockschmidt, Cambridge (GB); Juliana Patricia Vicente Franco, Cambridge (GB); Sneha Khullar, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/521,397

(22) Filed: Jul. 24, 2019

(65) Prior Publication Data
US 2020/0302013 A1   Sep. 24, 2020

Related U.S. Application Data

(60) Provisional application No. 62/820,816, filed on Mar. 19, 2019, provisional application No. 62/820,821, filed on Mar. 19, 2019.

(51) Int. Cl.
*G06F 40/18* (2020.01)
*G06F 3/0481* (2013.01)
(Continued)

(52) U.S. Cl.
CPC ............ *G06F 40/18* (2020.01); *G06F 3/0481* (2013.01); *G06F 3/0482* (2013.01);
(Continued)

(58) Field of Classification Search
CPC ............................... G06F 40/174; G06F 40/18
See application file for complete search history.

(56) References Cited

U.S. PATENT DOCUMENTS 5,603,021 A * 2/1997 Spencer .................. G06F 40/18
5,890,174 A * 3/1999 Khanna ................... G06F 40/18
                                                                   715/210

(Continued)

FOREIGN PATENT DOCUMENTS

CA            2525986 A1        6/2006

OTHER PUBLICATIONS

"Add Formulas & Functions", Retrieved From: https://support.google.com/docs/answer/46977?co=GENIE.Platform%3DDesktop&hl=en&oco=1, Retrieved Date: May 24, 2019, 2 Pages.
(Continued)

*Primary Examiner* — Asher D Kells

(57) ABSTRACT

Systems, methods, and software are disclosed herein for enhancing functions and formulas in spreadsheets. A computing apparatus detects a beginning of a formula in a cell of a spreadsheet. In response to detecting the beginning of the formula, the computing apparatus identifies a vector representation of a context of the cell and supplies the vector representation as input to one or more machine learning models. The one or more machine learning models produce output comprising one or more suggested functions for the formula and one or more suggested operands, which the computing apparatus presents in a user interface to the spreadsheet.

20 Claims, 17 Drawing Sheets

(51) Int. Cl.

| | | |
|---|---|---|
| *G06F 3/0484* | (2013.01) | |
| *G06F 9/451* | (2018.01) | |
| *G06F 40/205* | (2020.01) | |
| *G06F 40/174* | (2020.01) | |
| *G06F 40/274* | (2020.01) | |
| *G06F 3/0482* | (2013.01) | |
| *G06N 3/04* | (2006.01) | |
| *G06N 3/08* | (2006.01) | |

(52) U.S. Cl.
 CPC ............ *G06F 3/0484* (2013.01); *G06F 9/451* (2018.02); *G06F 40/174* (2020.01); *G06F 40/205* (2020.01); *G06F 40/274* (2020.01); *G06N 3/0454* (2013.01); *G06N 3/08* (2013.01)

(56) References Cited

U.S. PATENT DOCUMENTS

| | | | |
|---|---|---|---|
| 5,949,416 | A | 9/1999 | Bush |
| 6,828,988 | B2 | 12/2004 | Hudson et al. |
| 7,266,763 | B2 | 9/2007 | Peyton-Jones et al. |
| 7,451,397 | B2 | 11/2008 | Weber et al. |
| 7,548,892 | B2 | 6/2009 | Buck et al. |
| 8,166,385 | B2 | 4/2012 | Garcia-Molina et al. |
| 9,075,787 | B2 | 7/2015 | Schodl |
| 9,286,285 | B1* | 3/2016 | Vagell ............... G06F 40/18 |
| 9,489,368 | B2 | 11/2016 | Otero et al. |
| 9,519,859 | B2 | 12/2016 | He et al. |
| 9,594,735 | B2 | 3/2017 | Bhargav et al. |
| 9,805,016 | B2 | 10/2017 | Otero et al. |
| 10,089,576 | B2 | 10/2018 | Gao et al. |
| 10,402,750 | B2 | 9/2019 | Weston et al. |
| 10,565,404 | B2 | 2/2020 | Campbell et al. |
| 10,606,946 | B2 | 3/2020 | Gao et al. |
| 10,963,779 | B2 | 3/2021 | Le et al. |
| 2002/0091871 | A1* | 7/2002 | Cahill ............... G06F 40/18 |
| | | | 719/315 |
| 2002/0118221 | A1* | 8/2002 | Hudson ............... G06F 40/18 |
| | | | 715/711 |
| 2004/0103366 | A1 | 5/2004 | Peyton-Jones et al. |
| 2006/0053363 | A1* | 3/2006 | Bargh ............... G06F 40/18 |
| | | | 715/213 |
| 2006/0282818 | A1* | 12/2006 | DeSpain ............... G06F 40/18 |
| | | | 717/109 |
| 2007/0211064 | A1 | 9/2007 | Buck et al. |
| 2007/0256004 | A1 | 11/2007 | Payette |
| 2010/0083089 | A1* | 4/2010 | Rapp ............... G06F 3/04842 |
| | | | 715/217 |
| 2010/0312788 | A1* | 12/2010 | Bailey ............... G06F 16/332 |
| | | | 707/769 |
| 2012/0137203 | A1 | 5/2012 | Schodl |
| 2013/0073939 | A1* | 3/2013 | Honsowetz ............. G06F 40/18 |
| | | | 715/212 |
| 2013/0073940 | A1* | 3/2013 | Honsowetz ............. G06F 40/18 |
| | | | 715/220 |
| 2014/0372854 | A1* | 12/2014 | Otero ................ G06F 40/18 |
| | | | 715/219 |
| 2015/0074027 | A1 | 3/2015 | He et al. |
| 2015/0169530 | A1* | 6/2015 | Otero .................. G06F 3/0488 |
| | | | 715/219 |
| 2016/0154780 | A1 | 6/2016 | Otero et al. |
| 2017/0011289 | A1 | 1/2017 | Gao et al. |
| 2017/0032035 | A1 | 2/2017 | Gao et al. |
| 2017/0124053 | A1* | 5/2017 | Campbell ............. G06F 3/0482 |
| 2017/0140265 | A1 | 5/2017 | Le et al. |
| 2017/0193390 | A1 | 7/2017 | Weston et al. |
| 2018/0005122 | A1* | 1/2018 | McDaid .................. G06N 5/04 |
| 2018/0203836 | A1 | 7/2018 | Singh et al. |
| 2019/0042210 | A1 | 2/2019 | Gaunt et al. |
| 2019/0114537 | A1 | 4/2019 | Wesolowski et al. |
| 2019/0205359 | A1* | 7/2019 | Geisler ............. G06F 16/90344 |
| 2020/0042588 | A1* | 2/2020 | Sagalovskiy ............ G06F 40/14 |
| 2020/0184147 | A1* | 6/2020 | Chen ..................... G06F 3/0482 |
| 2020/0184149 | A1* | 6/2020 | Honsowetz ........... G06F 3/0482 |
| 2020/0302009 | A1 | 9/2020 | Stegmaier et al. |

OTHER PUBLICATIONS

"Pre Interview First Office Action Issued in U.S. Appl. No. 16/521,295", dated Oct. 16, 2020, 4 Pages.

Habraken, Joe, "Office 2016 in Depth—Excel—Working with Excel Functions", Published by Que, Oct. 23, 2015, pp. 354-367.

"International Search Report and Written Opinion Issued in PCT Application No. PCT/US2020/021626", dated Jun. 29, 2020, 13 Pages.

"International Search Report and Written Opinion Issued in PCT Application No. PCT/US2020/021935", dated Jun. 29, 2020, 15 Pages.

"Final Office Action Issued in U.S. Appl. No. 16/521,295", dated Apr. 23, 2021, 14 Pages.

* cited by examiner

FIGURE 10B

|   | A | B | C |
|---|---|---|---|
| 1 |   |   |   |
| 2 |   |   |   |
| 3 | Jocelyn | 18 | 13 |
| 4 | Karly | 12 | 13 |
| 5 | Kelsey | 19 | 14 |
| 6 | Lavonne | 13 | 20 |
| 7 | Leandro | 20 | 12 |
| 8 | Leatha | 19 | 14 |
| 9 | Lettie | 19 | 14 |
| 10 | Letty | 16 | 15 |
| 11 |   |   |   |
| 12 | Class AVERAGE: | =  AVERAGE(B3:B10) ← 1203 |   |
| 13 | Median |   Fx AVERAGE |   |
| 14 |   |   Fx IF |   |

FORM-BASED FORMULA EDITING IN SPREADSHEETS

RELATED APPLICATIONS

This application claims the benefit of priority to: U.S. Patent Application Ser. No. 62/820,821, filed on Mar. 19, 2019, and entitled "Enhanced Editing of Formulas in Spreadsheets;" and to U.S. Patent Application Ser. No. 62/820,816, also filed on Mar. 19, 2019, and entitled "Enhanced Editing of Formulas in Spreadsheets," both of which are hereby incorporated by reference in their entirety.

TECHNICAL FIELD

Aspects of the disclosure are related to the field of software applications, and in particular, to editing formulas and functions in spreadsheets.

TECHNICAL BACKGROUND

Spreadsheet applications are powerful tools for interacting with data of all types. Familiar features of spreadsheet applications include the ability to sort and tabulate data, to generate charts and pivot tables for analyzing data, and to create formulas that automatically calculate values based on the contents of other cells.

Many formulas include functions to expedite programming that would otherwise be tedious, difficult, or both. For example, a range of cells could be added by a formula that specifies each cell as an individual operand of the formula. Alternatively, using the SUM function in a formula provides a much simpler notation whereby the operand is expressed by the range of cells being added together. Other popular but more complex functions include the IF, ROUND, LOOKUP, and MATCH functions.

Unfortunately, many users struggle with using formulas and functions in spreadsheets—especially the more complex ones. At one level, a given user may not know which function to use in a formula, while at another level, the user may lack expertise with a specific function, leading to errors and other frustrations. Most applications provide at least a modicum of help such as basic auto-complete tools and in-line function definitions which, while somewhat useful, only partly reduce the friction associated with formulas and functions.

Overview

Technology is disclosed herein that enhances the user experience with respect to editing formulas and functions in spreadsheets. In at least one implementation, machine learning is leveraged to suggest functions for formulas, while in another implementation, a form allows the user to edit the parameters of a function with ease.

For example, a computing apparatus under the control of software as disclosed herein detects a beginning of a formula in a cell of a spreadsheet. In response to detecting the beginning of the formula, the computing apparatus identifies a vector representation of a context of the cell and supplies the vector representation as input to one or more machine learning models. The one or more machine learning models produce output comprising one or more suggested functions for the formula and one or more suggested operands, which the computing apparatus presents in a user interface to the spreadsheet. In addition, the one or more machine learning modules, examples of which include neural networks and random forest models, may be implemented in the context of or external to the spreadsheet application that hosts the spreadsheet.

In another example, the computing apparatus displays at least a portion of a formula in a user interface to a spreadsheet, wherein the portion of the formula comprises a character string that includes one or more functions expressed therein. The computing apparatus displays a form in the user interface, wherein the form includes fields corresponding to parameters of an active one of the one or more functions expressed in the character string. The computing apparatus populates the character string at positions corresponding to the parameters of the active one, of the one or more functions, with values entered into the fields of the form. As the active one, of the one or more functions, changes to a newly active function, the computing apparatus changes the fields in the form to correspond to parameters of the newly active function.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, like reference numerals in the drawings designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 10A-10B illustrate an operational scenario pertaining to function suggestions in an implementation.

FIG. 12 also illustrates function suggestions in an implementation.

DETAILED DESCRIPTION

Figure 1:
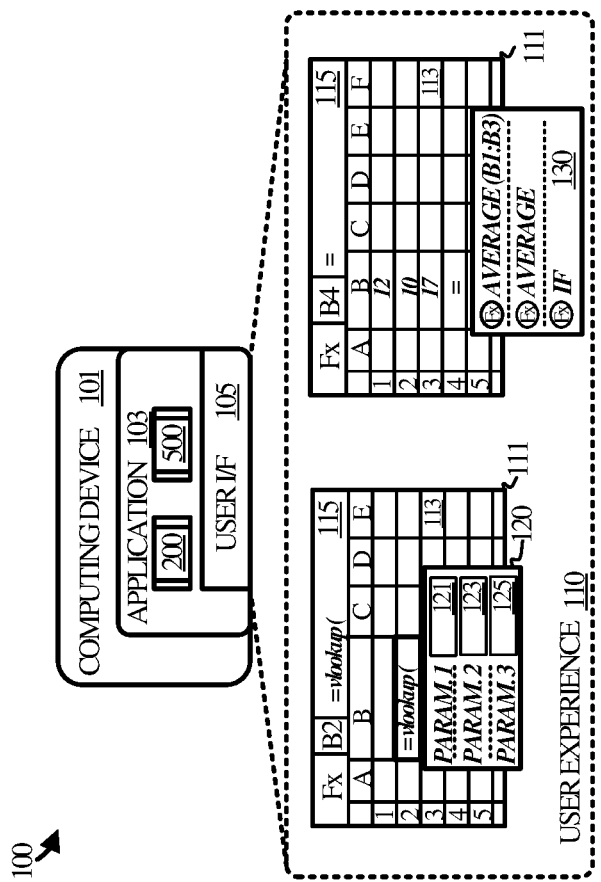
FIG. 1 illustrates an operational environment in an implementation.

Technology disclosed herein relates to systems, methods, and software that enhance the user experience with respect to formulas and functions in spreadsheets, tables, and other such environments. In at least one implementation, a machine learning model is trained to identify relevant functions to suggest in a user interface. In the same or other implementations, a user may enter, edit, or otherwise interact with the components of a function via a form surfaced in the user interface. Taken together or apart, such improvements allow users to program formulas and functions with greater ease and accuracy.

With respect to the machine learning technology disclosed herein, one or more machine learning models are trained using a corpus of data that exhibits a relationship between functions and their surrounding context. For example, the training data may include functions drawn from a set of spreadsheets and at least some of the other content of the spreadsheets. The training data may be fed into a neural network, random forest model, or other such machine learning models during a training phase to produce a model that may be employed in a live environment. In some cases, the training data comprises vector representations of the functions and content from the sampled spreadsheets.

At runtime, the trained model is deployed locally or remotely with respect to the editing environment within which a user is working. For instance, the trained model may run in the context of a spreadsheet application, a browser application, in an operating system utility, or "in the cloud" on a server remote from the user's immediate application environment.

Once loaded, one or more components of the application being used detects the beginning of a formula in a cell of a spreadsheet and, in response, identifies a vector representation of the context of the cell being edited. The application supplies the vector representation as input to the model and receives its output which includes one or more suggested functions for the formula and one or more suggested operands for each of the suggested functions. The application then displays, causes to be displayed, or otherwise presents the output in a user interface to the spreadsheet. Users may consider and select from the suggestions at which point the formula in the cell and/or formula bar is populated with the selected suggestion, saving time and improving accuracy.

In some implementations, the software application is also capable of detecting the beginning of a nested function within the formula in the cell. In response, the application identifies a new or updated vector representation of the context of the cell and supplies the updated vector representation as subsequent input to the one or more machine learning models. The updated vector representation may not be needed in some scenarios, in which case the same vector representation can be used as with the earlier suggestions. The application receives subsequent output produced by the one or more machine learning models that includes one or more subsequent suggestions for editing the formula and presents them in the user interface.

Examples of the one or more machine learning models include artificial neural networks and decision tree models (e.g. random forest algorithms). The output produced by the one or more machine learning models may include a ranking of the one or more suggested functions relative to each other such that the functions may be displayed in order of their ranking. The functions may thus be displayed in order of their determined relevance as opposed to in an alphabetical order.

The context of a given cell, which is used to build the vector representation, includes the contents of cells proximate to the cell in the spreadsheet. The vector representation of a cell does not include the actual contents of the cells proximate to the cell being edited. Rather, the vector representation of a given cell includes information that describes more abstractly what the contents of the neighboring cells represent. For instance, several rows of cells in a column may include numbers formatted as currency. The vector representation could thus describe that grouping of cells in the abstract, as opposed to encoding the actual values of the cells in the vector representation. In some implementations, strings in neighboring cells may be split, or tokenized, and the resulting components encoded into a vector representation, which may then be combined with other vector representations of the context. For instance, the phrase "the total" may be split into "the" and "total."

The context of the cell in some embodiments may also include one or more user interactions with the spreadsheet that occur prior to the user input. For instance, the fact that the user recently copied and pasted data may be included in the context, or that the user recently navigated from one sheet in a workbook to another. Such additional context may also be described abstractly in the vector representation of the context of a cell being edited.

With respect to the form-based function editing disclosed herein, one or more components of an application display, cause to be displayed, or otherwise render at least a portion of a formula in a user interface to a spreadsheet. The formula itself is comprised of a character string entered into a cell or formula bar, which the application parses to identify one or more functions expressed in the string.

Having identified one or more functions in the formula, the application displays (or causes to be displayed) a form in the user interface that includes fields corresponding to parameters of an active one of the one or more functions expressed in the character string. The active function may be determined based on a position of the cursor in the cell or formula bar, for example, the most recent function to have been entered, or by some other criteria. The user may enter values in the fields for the parameters of the active function. The application receives the values and populates the character string at positions corresponding to the parameters of the active function.

The active function may change in response to user input. For instance, the user may navigate the cursor from one function to another within the formula (in an example that includes two or more functions). In another example, the user may add a function to the character string or even a nested function. In each case, the active function changes to a newly active function, which drives the application to change the fields in the form to correspond to parameters of the newly active function.

The newly active function may be added by a direct edit of the character string outside of the form such as from within the cell or within a formula bar. In other scenarios, the user may enter a nested function as a value to one of the parameters of the active function. Doing so may cause the application to both populate the character string with the nested function and to change the fields in the form to correspond to the parameters of the nested function. Deleting the nested function from the formula may cause the application to revert back to the previously active function as the newly active function.

The form in some implementations may be a non-modal form, meaning that the focus of the application can change from the form to other elements of the user interface, such as the cell or the formula bar, without having to close or otherwise hide the form. The contents of the form could also be synchronized with the contents of the formula such that adding or removing text in one causes the same text to be added or removed in the other. The application may auto-populate one or more fields of the form with default or suggested values which in some instances may be determined using the machine learning techniques discussed above. For example, the vector representation of the cell being edited could include an indication of the particular function associated with the form and the machine learning model could return suggested parameters with which to populate the fields of the form.

Various technical effects may be appreciated with respect to the machine learning and form-based function editing disclosed herein. Leveraging a machine learning model to suggest possible functions, function parameters, or both, can expedite the user experience with respect to formulas. Auto-suggesting functions can also improve the accuracy of a formula, reduce errors, and improve the efficacy of the formula. For instance, a better function may be suggested to and selected by the user than what the user would have composed independent of the suggestions. Similarly, interacting with functions and their parameters via a form can improve accuracy and reduce errors, and improve efficacy, especially when combined in tandem with auto-suggestions for functions and function parameters.

In some embodiments of the present technology, an application may suggest useful functions to new users of the application because new users have been found to often manually hard-code calculations as they do not discover many formulas accessible to them within the application. For example, manual, hard-coded calculations for the SUM function are common such as "=12+23+7." Errors in application workbooks are common for new and experienced users. Therefore, suggesting useful functions to new users may increase speeds of formula authoring as well as reduce errors while formula authoring.

Various implementations of the present technology include features that may be used to make predictions for a present cell related to content in neighboring cells. In some implementations, words in neighboring cells may be used to make predictions related to desired models. In other implementations, parent functions, argument numbers, functions in neighboring cells, candidates for range references, and cell data types of neighboring cells (e.g. numeric and string) may be used to make predictions for a present cell. For example, a neighboring cell may include the word "total," in response to which the function SUM may be predicted. In another example, a neighboring cell may contain the string "median," in which case the present technology may predict that a user desires the present cell to contain a median of some data set in the workbook. In yet another example, an application may predict that the data set over which to calculate the median as "H1:H3."

In some implementations, the application may identify range candidates for a present cell. For example, the application may restrict a model to one-dimensional ranges. Alternatively, the application may search for candidates for a present cell to the left and above an active cell, in some examples. Some features comprised by the present technology may include a parent function, argument number, length of range, distance from active cell, and data types of cells in a range.

In some implementations, the application may implement header identification to exclude possible headers from a range of candidates. The header itself may be identified using machine learning or heuristically. For example, a header cell may contain the year relevant to the data set, in which case the application may exclude the numerical year at the beginning of a dataset when formulating a model. In other examples, columns may be labelled with numbers such as "1, 2, 3 . . . " In the present example, the application may exclude the header numbers from any calculations containing the dataset.

In another implementation, the application may identify two-dimensional ranges during a table-extraction process. Identifying two-dimensional ranges may enable a model to predict more complex formulas such as VLOOKUP, in an example.

The present technology may create datasets personalized to a user. By opting to share a user's data, the application may make improved, more personalized predictions that are specific to the types of spreadsheets that a user or an organization typically create.

In yet another implementation, an application may include model interpretability in which as user interface may help a user understand why they see the predictions they are given. For example, a user may highlight or otherwise emphasize via formatting choices the word "average" in a neighboring cell, which may contribute to the application predicting the use of the AVERAGE function. In another example, the application may suggest the AVERAGE function at least partly due to the mere presence of the word "average" in a neighboring cell, in which case the application could provide a visual emphasis on the cell and/or word such as by temporarily coloring the boundary of the cell or its contents.

Referring now to the drawings, FIG. 1 illustrates an operational environment 100 in an implementation. Operational environment 100 includes computing device 101, on which application 103 runs. Application 103 includes user interface 105, via which application 103 may receive user input and surface graphical elements, information, and the like. Examples of computing device 101 include, but are not limited to, desktop computers, laptop computers, server computers, and other physical or virtual computing devices, of which computing system 1601 is generally representative.

Application 103 may be implemented as a stand-alone application but may also be integrated in another application. Application 103 may be a native application, a browser-based application, a mobile application, or any other type of software application. Application 103 may be implemented in firmware or hardware in some cases.

Figure 2:
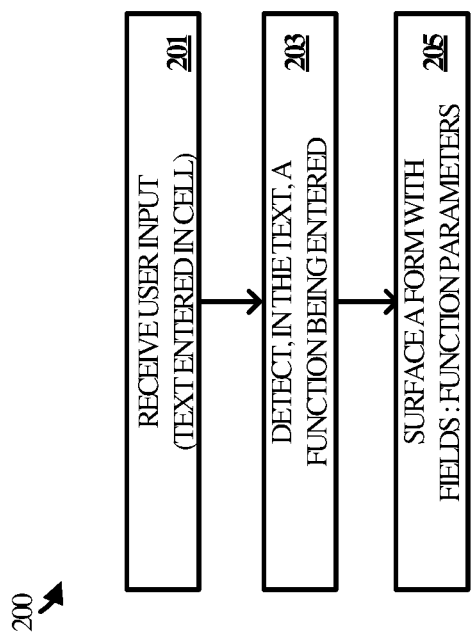
FIG. 2 illustrates a formula process in an implementation.

Application 103 employs one or both of formula process 200 and formula process 500 to enhance the user experience 110 when interacting with formulas in spreadsheets. Formula process 200 may be implemented in program instructions in the context of any of the modules, components, or other such programming elements of application 103. The program instructions direct the underlying physical or virtual computing system(s) to operate as described for formula process 200, referring parenthetically to the steps in FIG. 2.

In operation, application 103 receives user input, such as text entered into a cell of a spreadsheet (step 201), represented by spreadsheet 111. Spreadsheet 111 includes various cells, of which cell 113 is representative. The cells are defined by their row and column in the spreadsheet 111. Spreadsheet 111 also includes a formula bar 115.

In this case, the text that is entered is "=vlookup" in cell "B2." Application 103 parses the text to determine whether an indication of a function is present in the text. If an indication of a function is detected (step 203), then application 103 identifies the function and surfaces a form 120 in user interface 105 having fields 121, 123, and 125 corresponding to the parameters of the function (step 205). The end user may then proceed to edit the function through the fields 121, 123, and 125 in the form, through the cell (B2), and/or through formula bar 115.

In some implementations, the form 120 is a non-modal form, meaning that user interface 105 is not locked into form 120. Rather, user input could be supplied through form 120 or through other elements of spreadsheet 111, such as the active cell or formula bar 115.

Figure 3:
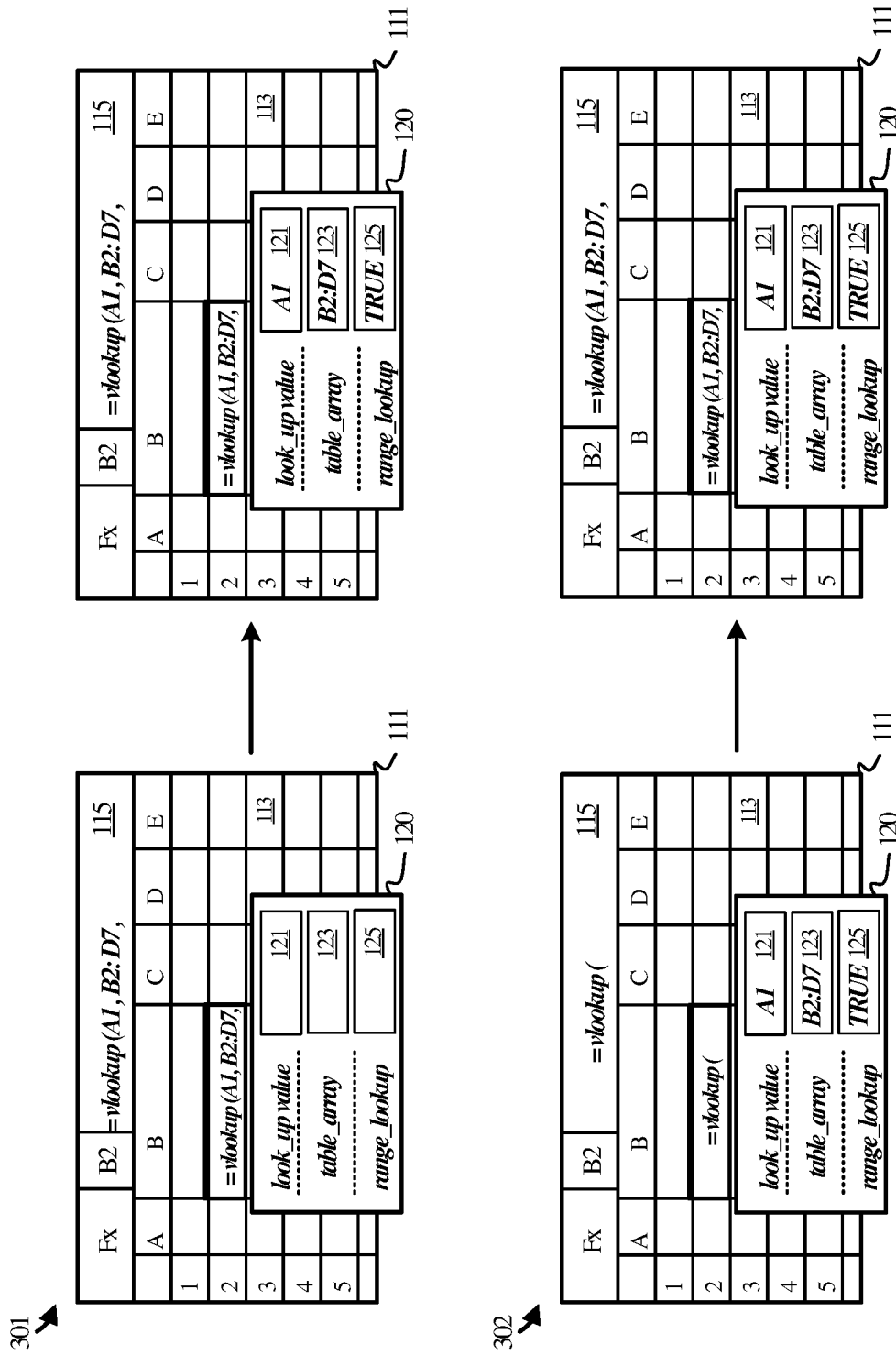
FIG. 3 illustrates an operational scenario in an implementation.

FIG. 3 briefly illustrates two operational scenarios 301 and 303 pertaining to formula process 200 in an implementation. In operational scenario 301, the user has entered "=vlookup" into cell B2, causing application 103 to surface form 120. Names for one or more of the parameters of the VLOOKUP function are displayed in form 120, as well as the fields 121, 123, and 125 for entering values.

It is assumed for exemplary purposes that the user has chosen to edit the contents of cell B2. That is, the user has begun to enter parameters in the formula for the VLOOKUP function. The example parameters are "A1" for a look-up value, "B2:D7" for a table array, and a default value (TRUE) for a range lookup parameter. Application 103 proceeds to parse the values entered in cell B2 and displays those values in their corresponding fields in form 120. In other words, as the user edits the text in cell B2, the values being entered are shown in form 120.

In operational scenario 302, the reverse occurs. Here, the user chooses to enter parameter values via form 120 (A1, B2:D7, and TRUE). Application 103 takes the values that were entered and inserts them into cell B2 automatically, thereby alleviating the need for the user to painstakingly edit the formula.

Figure 4:
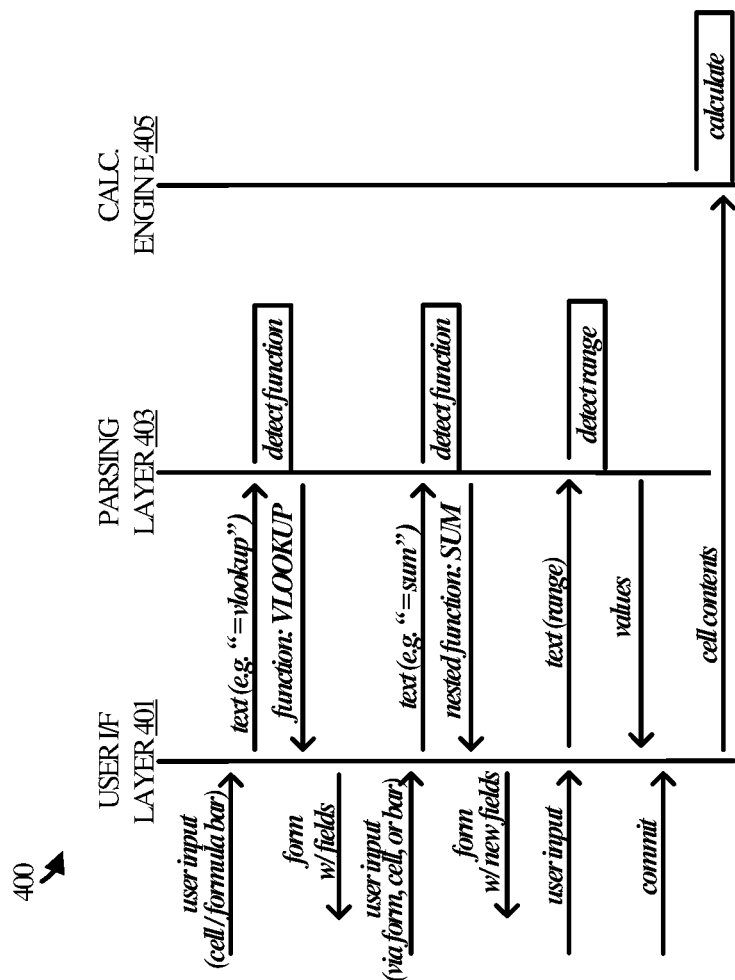
FIG. 4 illustrates an operational architecture and an associated operational scenario in an implementation.

FIG. 4 illustrates an operational architecture 400 for application 103 in an implementation. Operational architecture 400 includes a user interface layer 401 for handling user input and providing user output. Operational architecture also includes parsing layer 403 for parsing user input. Calculation engine 405 is also included for performing the calculations specified by the contents of spreadsheet 111. It may be appreciated that other layers in addition to those illustrated may be included.

In operation, user input is entered into a cell. The user input is received by user interface layer 401, which passes text from the user input to parsing layer 403. Parsing layer 403 receives the text and parses it for an indication of a function. Assuming a function is detected, parsing layer 403 passes an indication of the function to user interface layer 401.

User interface layer 401 responsively surfaces a form having fields for inputting parameters of the identified function. The parameters could be entered and committed to the spreadsheet, in which case the contents of the cell would be passed to calculation engine 405.

However, it is assumed for exemplary purposes that the user enters another function in one of the fields of the form. In such a scenario, user interface layer 401 passes the text to parsing layer 403. Parsing layer 403 again analyzes the text to determine whether a function is present. If so, parsing layer 403 returns an indication of the function. In this example, the identified function is a nested function since it was entered into one of the fields of the earlier-identified function.

Eventually, the contents of the cell are committed, at which time they are passed to calculation engine 405. Calculation engine 405 may then perform the one or more functions that were entered into the cell by way of one or more of editing the form, direct editing of the cell, and editing of a formula bar.

Figure 5:
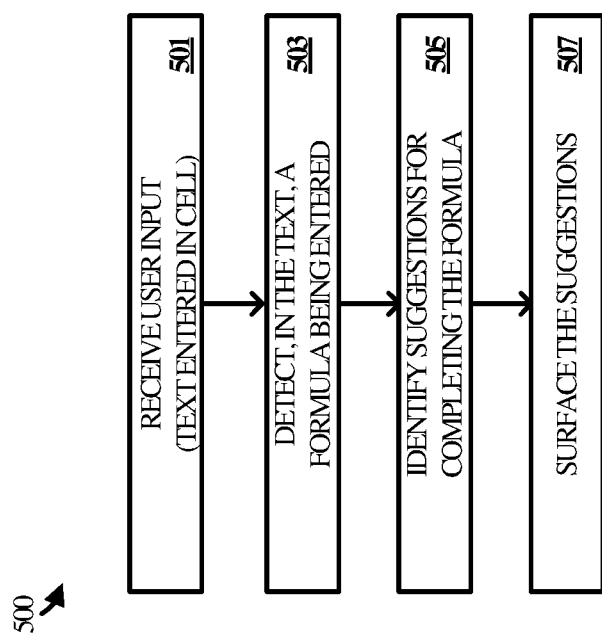
FIG. 5 illustrates a formula process in an implementation.

Referring now to FIG. 5, formula process 500 may also be implemented in program instructions in the context of any of the modules, components, or other such programming elements of application 103. The program instructions direct the underlying physical or virtual computing system(s) to operate as described for formula process 500, referring parenthetically to the steps in FIG. 5.

In operation, application 103 receives user input in the form of text entered into a cell (step 501). In this example, the user has entered the equals sign ("=") in cell B4.

Application 103 parses to the text to detect an indication in the text of a formula (step 503). If a formula (or the beginning of one) is detected, application 103 identifies suggestions for completing the formula based on a surrounding context of the cell (step 505). Since the equals sign indicates the beginning of a formula, application 103 proceeds to identify suggestions for completing the formula based on the surrounding context of cell B4. In this example, the surrounding context includes a set of numbers from B1:B3. Application 103 identifies three functions based on the surrounding context and surfaces them in a user interface 105 (step 507). The user may then select any of the suggested functions. In this example, an AVERAGE function with a range is suggested, as is the AVERAGE function without a range and the IF function.

Figure 6:
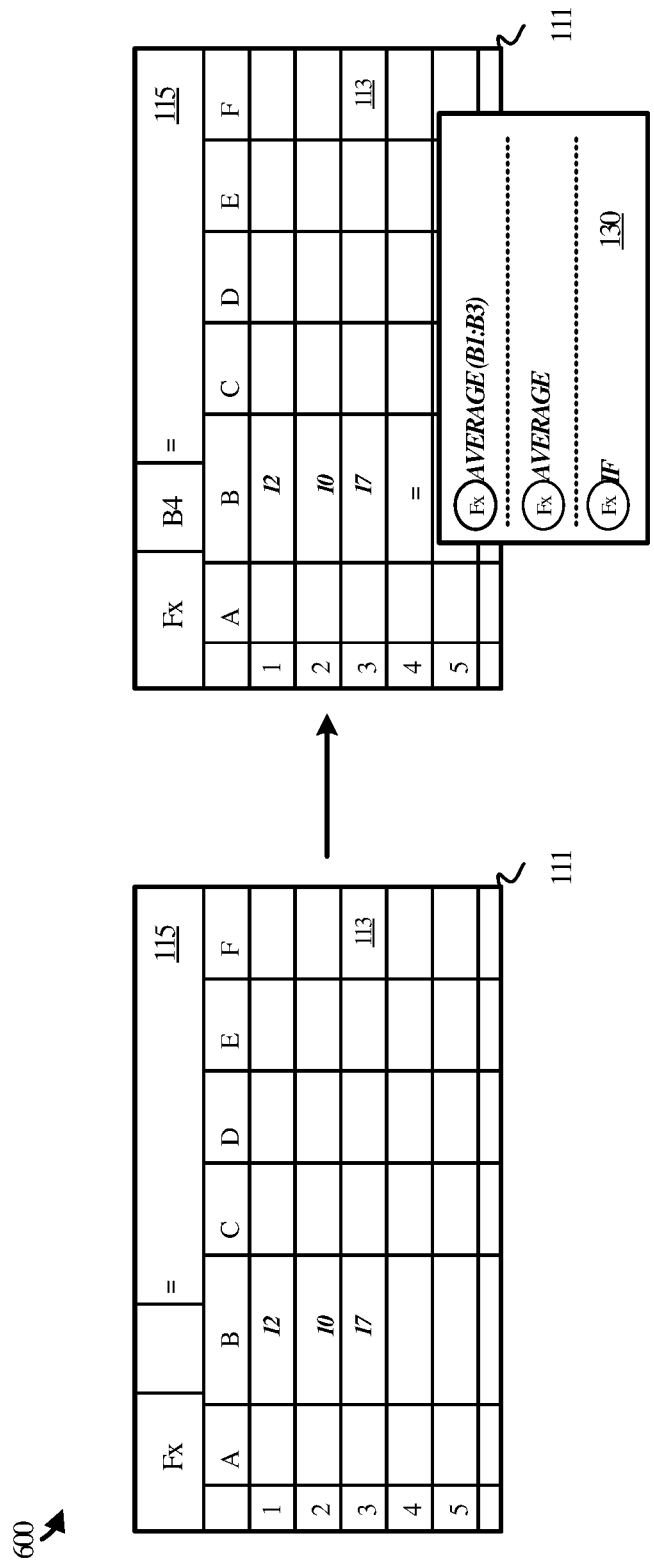
FIG. 6 illustrates an operational scenario in an implementation.

FIG. 6 briefly illustrates an operational scenario 600 pertaining to formula process 500 in an implementation. In operational scenario 600, three values have been entered in column B. The user then proceeds to enter the equals sign in cell B4. Entering the equals sign triggers application 103 to identify the surrounding context of cell B4 and to surface suggestions for completing the formula in menu 130.

Figure 7:
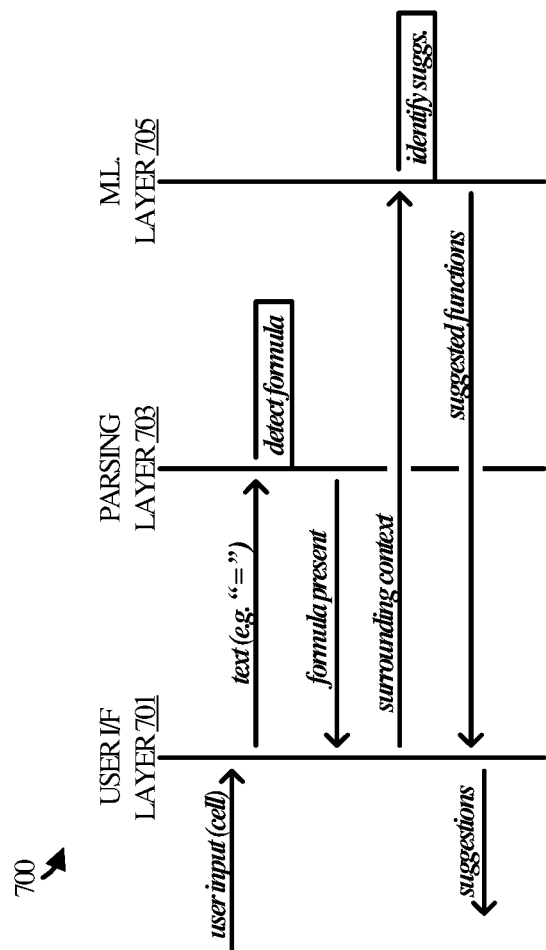
FIG. 7 illustrates an operational architecture and an associated operational scenario in an implementation.

FIG. 7 illustrates an operational architecture 700 for application 103 in an implementation. Operational architecture 700 includes a user interface layer 701 for handling user input and providing user output. Operational architecture also includes parsing layer 703 for parsing user input. Finally, machine learning layer 705 is included. It may be appreciated that other layers in addition to those illustrated may be included.

In operation, user input is entered into a cell. The user input is received by user interface layer 701, which passes text from the user input to parsing layer 703. Parsing layer 703 receives the text and parses it for an indication of a formula. Assuming a formula, parsing layer 703 passes an indication of the same to user interface layer 701. User interface layer 701 then requests machine learning layer 705 to provide suggestions based on a surrounding context of the cell into which the text was entered. The suggestions may include functions alone, functions with operands (e.g. ranges and arguments), or functions and functions with operands.

Machine learning layer 705 includes a model comprising an artificial neural network for identifying suggestions based on the surrounding context of the cell. Machine learning layer 705 receives the surrounding context from user interface layer 701 (or some possible from another layer) and feeds the surrounding context into the model. In some implementations, machine learning layer 705 may first generate an abstraction of the surrounding context and then put the abstracted information into a vector representation that can be fed into the model. As an example, a neighboring cell that has the string "total food sales" in it would be abstracted to something like "total sales" or "total." The vector representation is then the abstraction put into a numerical or symbolic form that a neural network can receive as input.

The model takes the surrounding context as input and outputs one or more suggested functions or other such information for completing the formula. The suggested functions are returned to user interface layer 701, which may then surface them in a user interface for consideration by the user.

Figure 8:
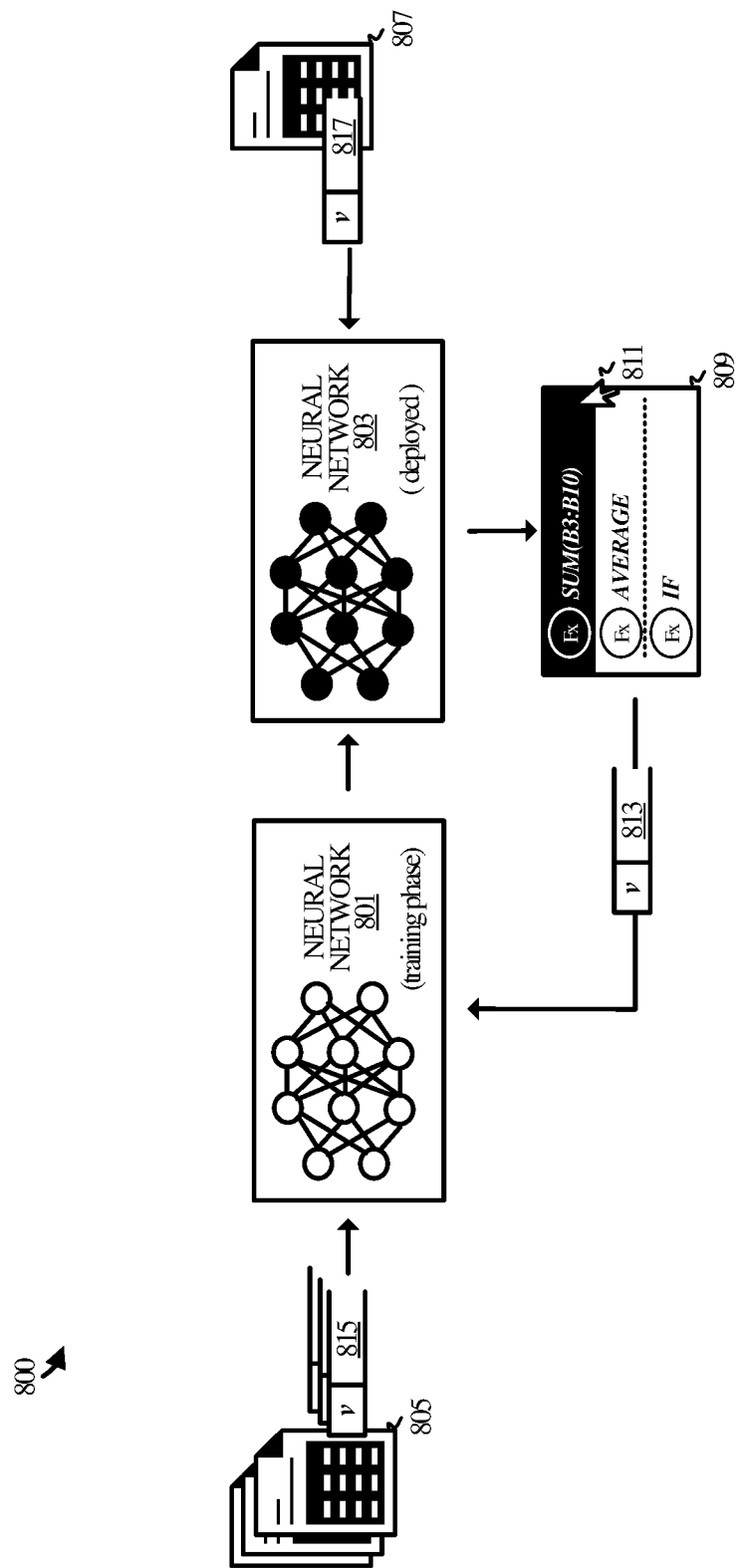
FIG. 8 illustrates a modeling technique and related operational scenario in an implementation.

FIG. 8 illustrates a modeling technique 800 for developing a machine learning model in an implementation. Modeling technique 800 includes neural network 801 and neural network 803. Neural network 801 represents a neural network in a training phase during which vector representations 815 of content 805 are supplied as input. As the neural network is trained on the data, it develops into a model capable of suggesting functions based on the surrounding context of a cell in a spreadsheet, table, or the like. The neural network in its trained state therefore is the machine learning model and as such can be deployed to enhance the user experience.

Neural network 803 represents the same neural network but in a deployed state. Neural network 803 takes one or more vector representations 817 of content 807 as input and produces a set of suggestions 809. For instance, a vector representation may identify characteristics of the cells surrounding a cell in which a user has started a formula.

As a user interacts with the suggestions, such as by making a selection 811 of one of the functions, feedback can be provided to the neural network in the form of one or more additional vector representations 813. The feedback can be used to continuously train the model by feeding the additional vector representations through the neural network.

Figure 9:
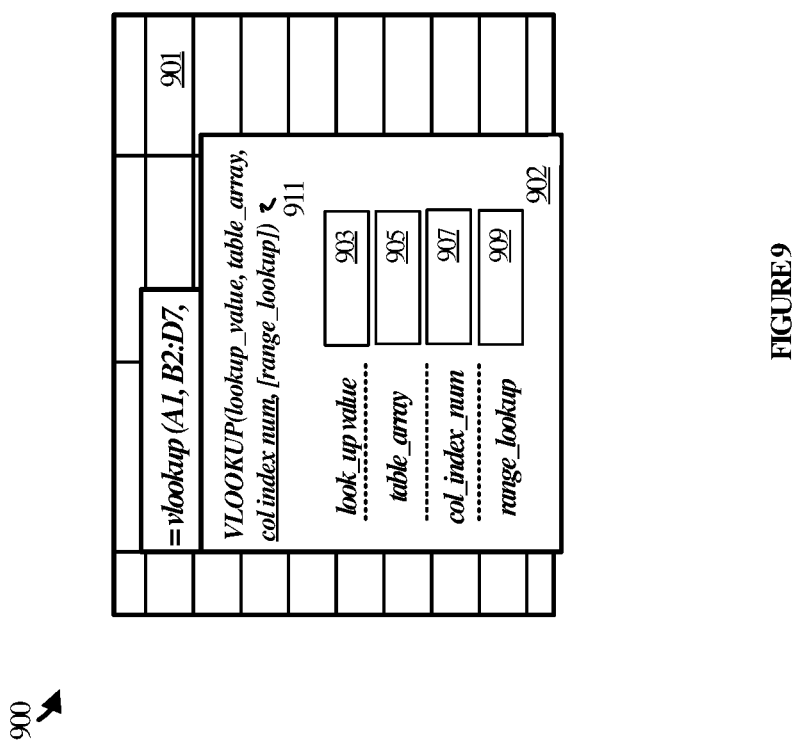
FIG. 9 illustrates form-based function editing in an implementation.

FIG. 9 illustrates a user experience 900 that may be provided by a suitable computing system, e.g. computing system 1601, employing a formula process (e.g. 200) in the context of an application. User experience 900 is an example of a cell in a spreadsheet 901 in which a user has entered the beginning of a function in a formula (VLOOKUP). The application with which the user is engaged surfaces a form 902 having fields 903, 905, 907, and 909 for interacting with the parameters of the function. The form also includes a format 911 for the function in the upper most portion of the form. The form and its fields are thus displayed in addition to the format or description of the function and its parameters.

Figure 10A:
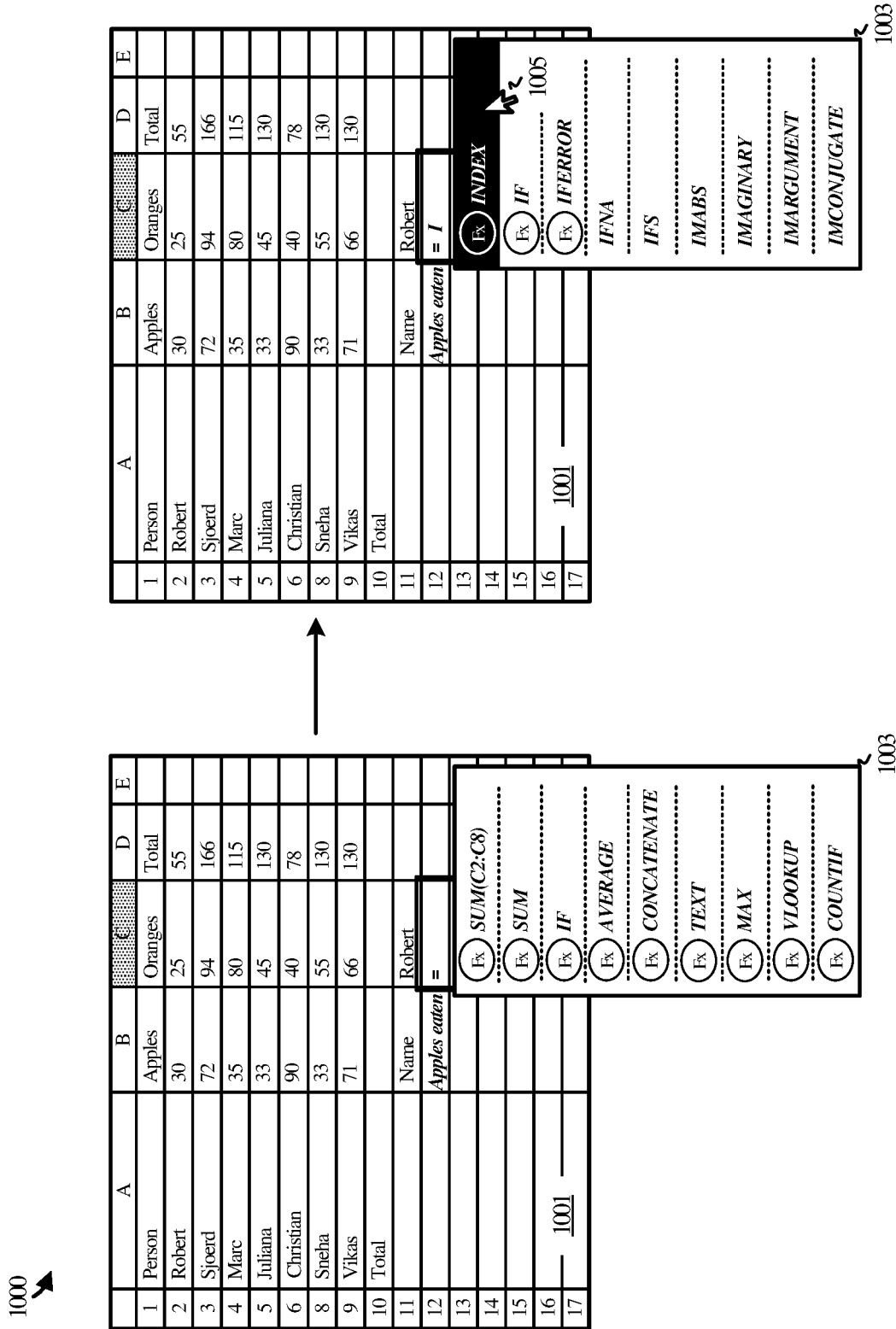
Figure 10B:
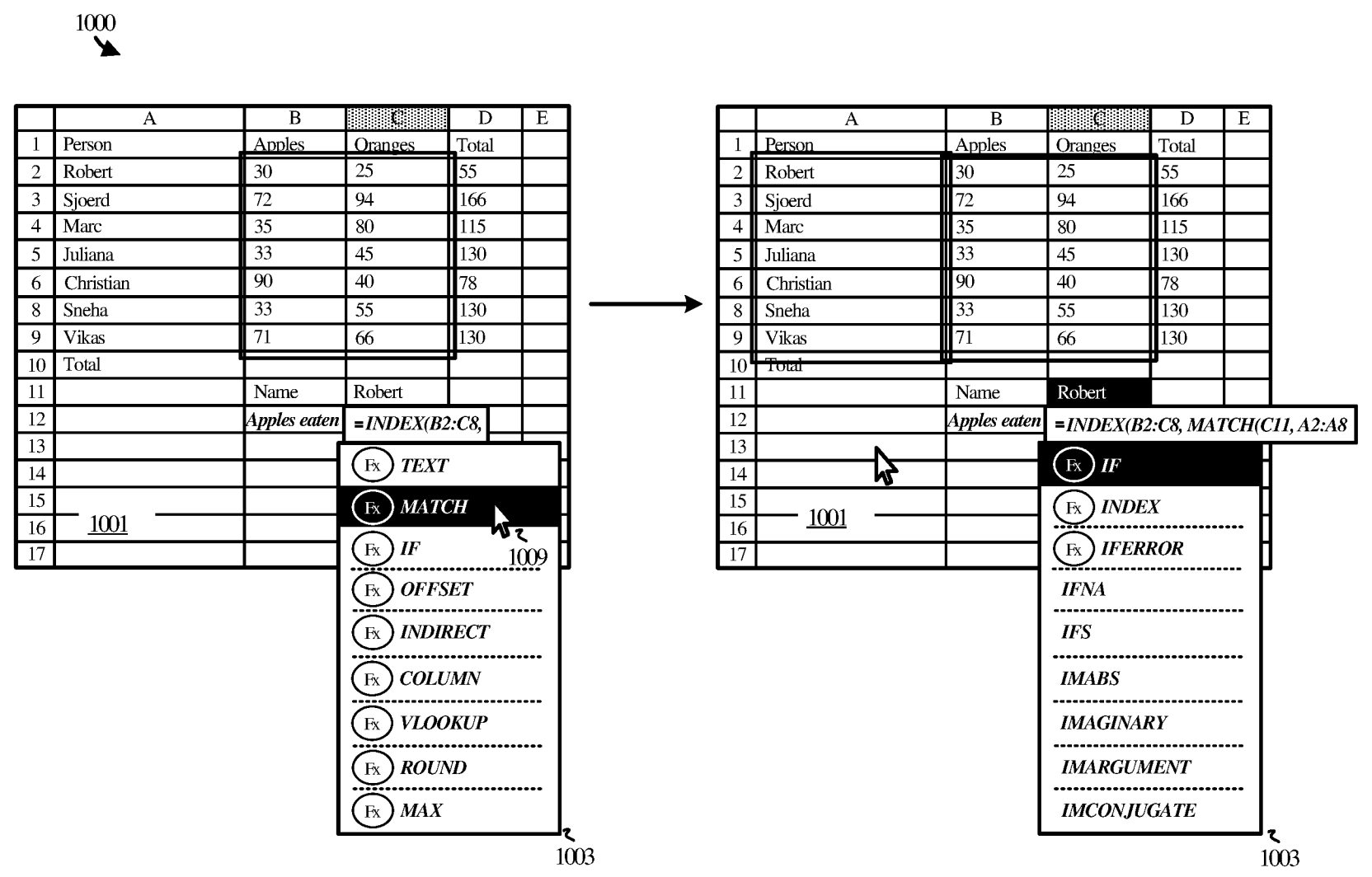

FIGS. 10A-10B illustrate another user experience 1000 that may also be provided by a suitable computing system, e.g. computing system 1601, employing a formula process (e.g. 500) in the context of an application. User experience 1000 includes user input entered into cell B11 of a spreadsheet 1001, which triggers the application to suggest functions in a menu 1003 for auto-completing the formula. The user input in this example is the equals sign, which indicates the start of a formula.

The suggestions in menu 1003 are based on the surrounding context of the cell, which includes three columns of numbers and one column of names, as well as the phrase "apples eaten" in cell C12. Such context is input into a machine learning model trained on a set of data comprising formulas in cells and their surrounding context.

The user experience 1000 transitions to a second stage in FIG. 10A whereby the user has proceeded to type the letter "I" after the equals sign. This triggers the application to update the list of suggested functions to those starting with "I" and also having relevance to the surrounding context. It is assumed for exemplary purposes that the user makes a selection 1005 of the INDEX function, causing the cell to be populated with the function in FIG. 10B.

In FIG. 10B the user has input a range for the index. In response to the range, the application suggests a list of nested functions in menu 1003 to operate within the index parameters. The user selects the match function via user input 1009, prompting the application to suggest a range and a cell value to match against the range.

Figure 11:
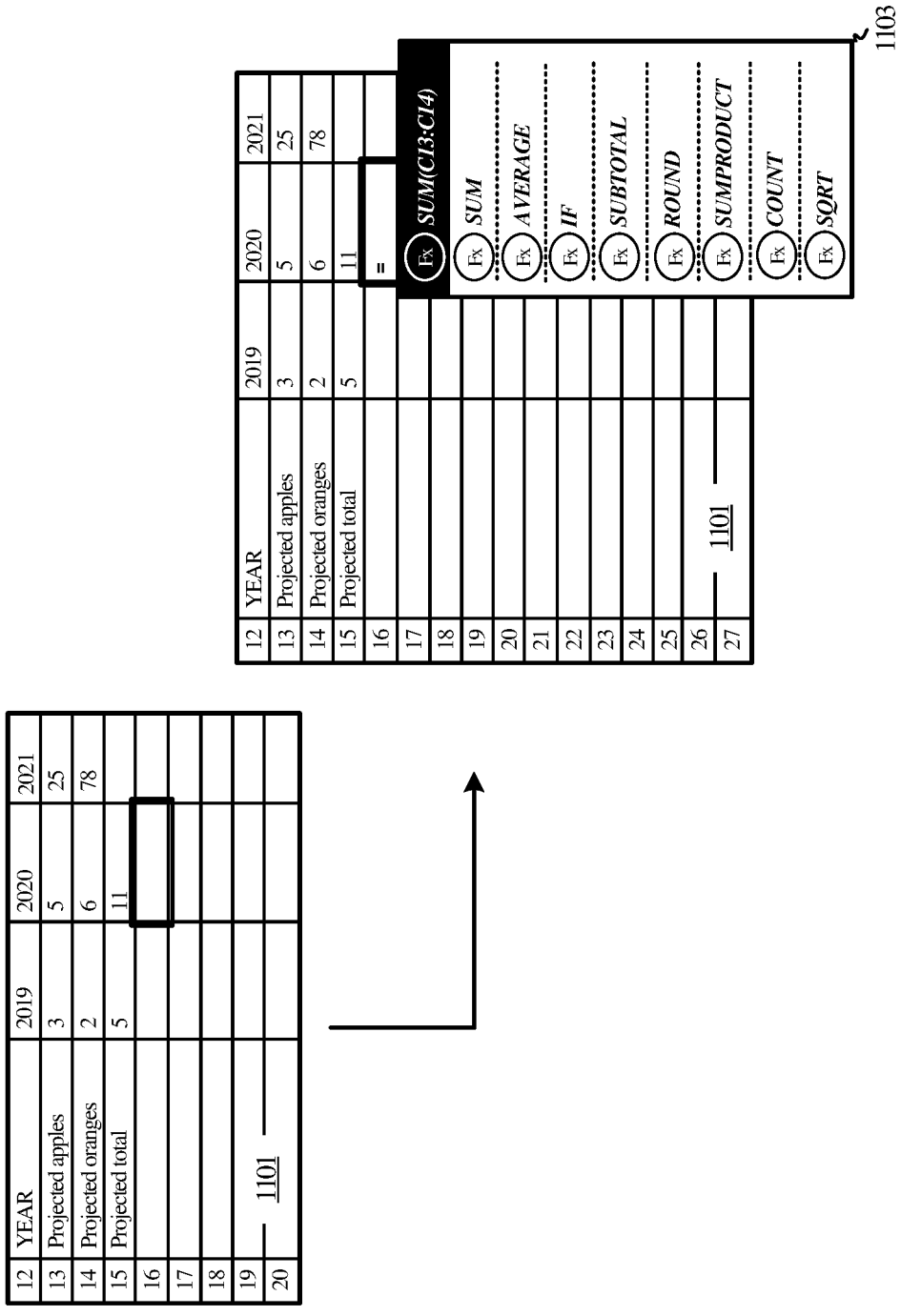
FIG. 11 illustrates another example of function suggestions in an implementation.

FIG. 11 illustrates another user experience 1100 that may also be provided by a suitable computing system, e.g. computing system 1601, employing a formula process (e.g. 500) in the context of an application. User experience 1100 includes a table of numbers 1101 having headers in the first row. However, the headers have a numerical type. The application is able to recognize that the values in the first row represent headers as opposed to numbers to be included in a sum. In addition, the application is able to recognize that the values in the last row of the first two columns include formulas. Accordingly, the application displays menu 1103 in which the first suggested function includes a suggested range that identifies only the two rows of data (C13:C14), rather than four, and excludes the header row and the formula row.

FIG. 12 illustrates user experience 1200 that may also be provided by a suitable computing system, e.g. computing system 1601, employing a formula process (e.g. 500) in the context of an application. In FIG. 12, the user enters an "equals" sign in cell B12 of spreadsheet 1201, which triggers the application to identify and display suggestions in menu 1203 for completing the formula. The surrounding context includes two columns of numbers and one column of names. In addition, cell A12 includes the word "average." Thus, the suggestions include two AVERAGE functions (including one that suggests a specific range), as well as an IF function.

Figure 13:
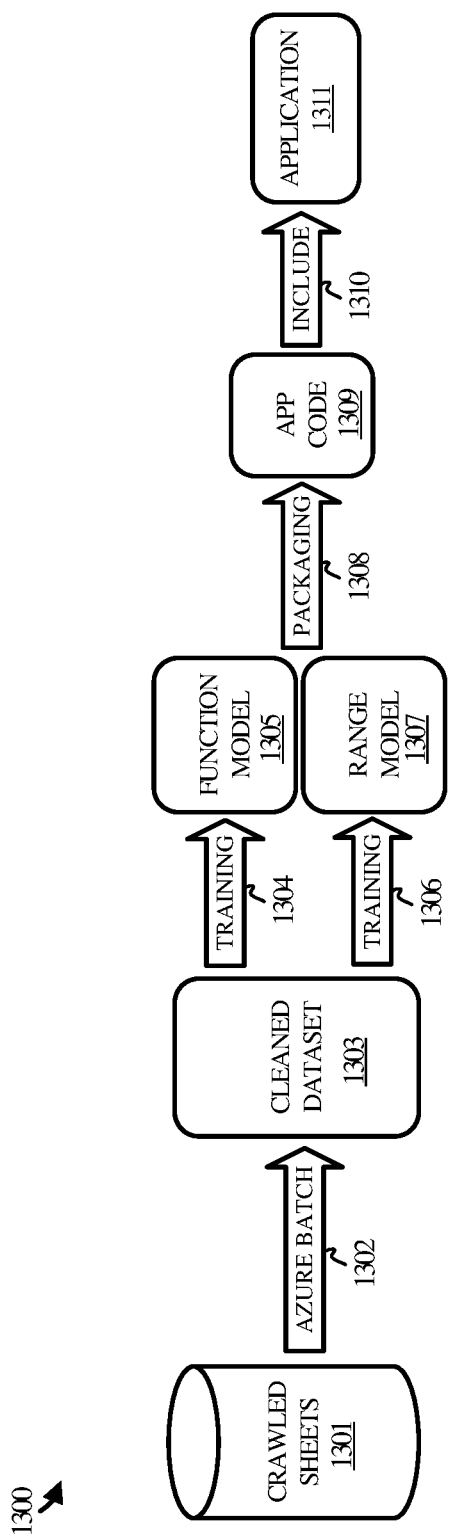
FIG. 13 illustrates a model development pipeline in an implementation.

FIG. 13 illustrates a model development pipeline 1300 for producing a models that may be utilized by an application to identify and surface suggestions for completing formulas. The pipeline includes sample spreadsheets 1301 that are crawled for formulas and their associated surrounding contexts. The sheets are uploaded to a cloud platform (e.g. Azure®) and modified into an abstracted format that can be input into a function model. In some cases, the abstracted format of the surrounding context data may be a vector representation of the data.

The cleansed data set 1303 is input into a function model 1305 during a training phase 1304 and into a range model 1307 during a training phase 1306. The function model 1305 is used to identify possible functions to suggest for completing a formula. The range model 1307 is used for suggesting possible ranges for the functions.

The models include artificial neural networks that are trained on the sample work sheets. Once the models have been trained, they are packaged 1308 in suitable components to be included in application code 1309. The application code 1309 may then be inserted, added to, or otherwise included 1310 with spreadsheet application code 1311 that may be shipped, downloaded, or otherwise executed in a runtime environment.

Figure 14:
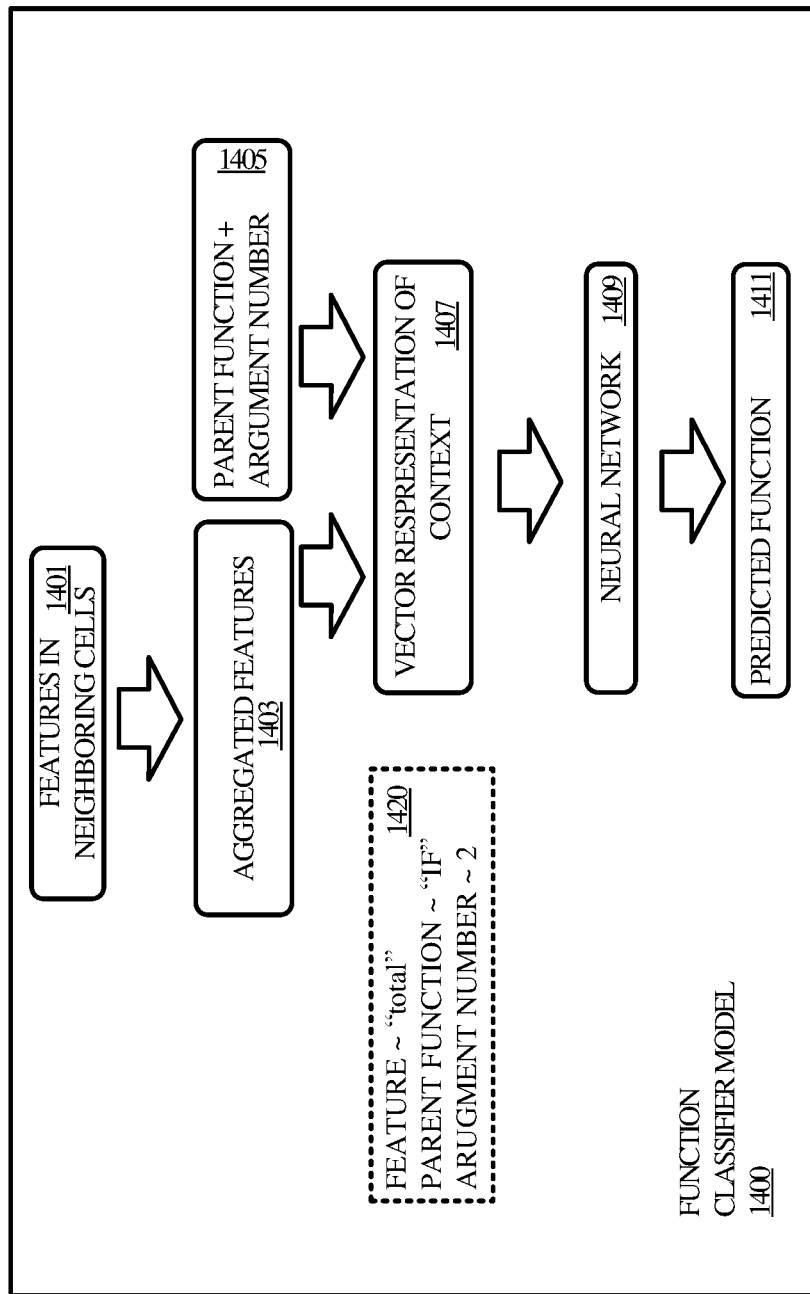
FIG. 14 illustrates a model classifier in an implementation.

FIG. 14 illustrates a function model 1401 (a.k.a. function classifier model). Function model 1401 takes features in neighboring cells 1401 as input to a component that aggregates the features 1403. In addition, the parent function(s)

and argument numbers 1405 are taken as input to the model. Examples 1420 of the parent function, argument numbers, and features include the word "total," the IF function, and two. The inputs are combined into a vector representation of the data 1407 which can be input into a neural network 1409. The output is one or more predicted functions 1411 that may be surfaced in a user interface.

Figure 15:
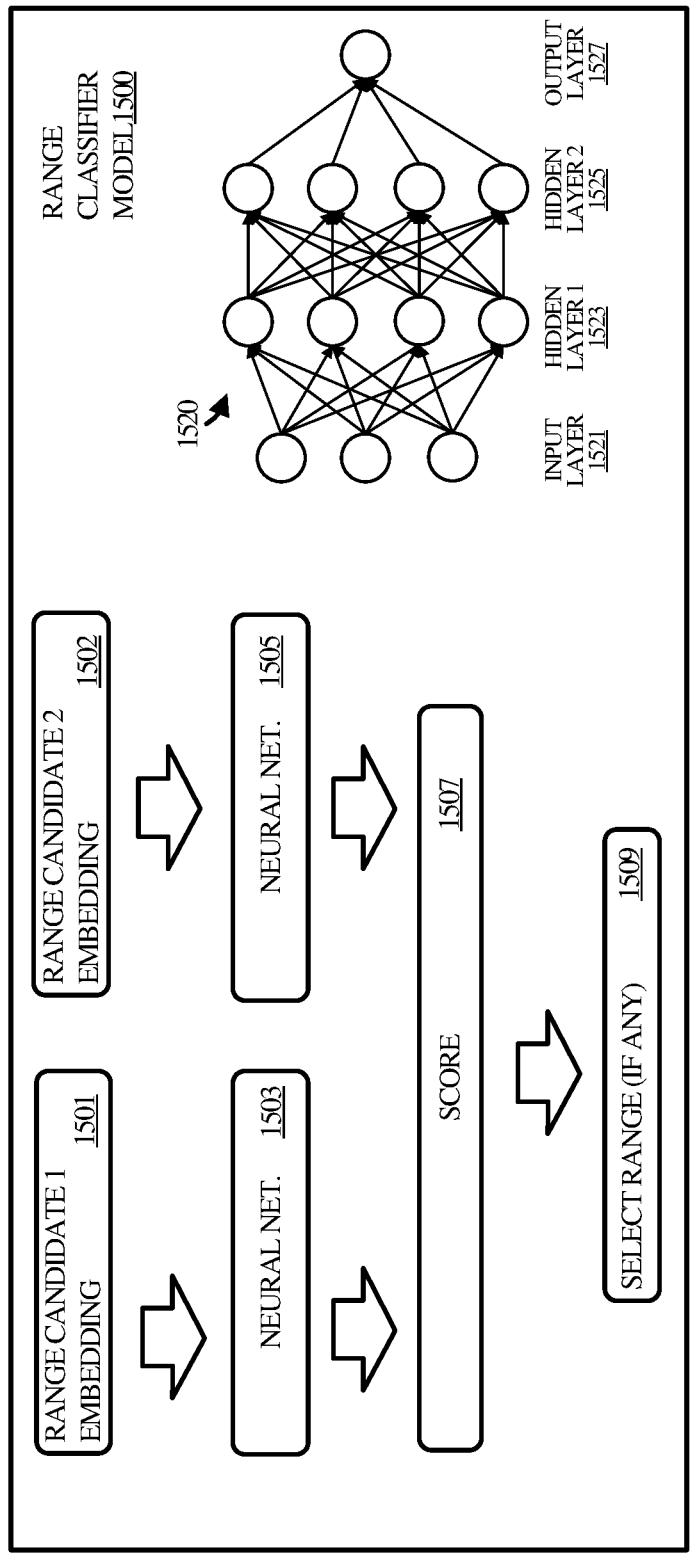
FIG. 15 illustrates a range classifier in an implementation.

FIG. 15 illustrates a range model 1500 (a.k.a. range classifier model). The range model 1500 takes range candidates 1501 and 1502 as inputs to one or more neural networks 1503 and 1505 that have been trained on similar data. The range candidates 1501 and 1502 may be obtained heuristically to construct a set of possible range candidates which are then scored by the neural network(s). Alternatively, a separate table/range machine learning model could be employed to identify the set of possible range candidates.

The range candidates are fed through the layers 1520 of the neural network(s) to produce a score for each range. The layers 1520 include, for example, an input layer 1521, hidden layers 1523 and 1525, and an output layer 1527. The range with the highest score is then combined with a function suggested by the function model 1401 in FIG. 14.

Figure 16:
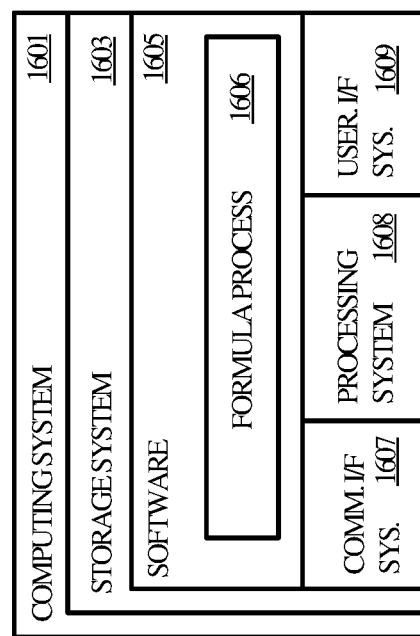
FIG. 16 illustrates a computing system suitable for implementing the various operational environments, architectures, processes, scenarios, and sequences discussed below with respect to the Figures.

FIG. 16 illustrates computing system 1601 that is representative of any system or collection of systems in which the various processes, programs, services, and scenarios disclosed herein may be implemented. Examples of computing system 1601 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 1601 may be implemented as a single apparatus, system, or device or may be implemented in a distributed manner as multiple apparatuses, systems, or devices. Computing system 1601 includes, but is not limited to, processing system 1608, storage system 1603, software 1605, communication interface system 1607, and user interface system 1609. User interface system 1609 is optional in some implementations. Processing system 1608 is operatively coupled with storage system 1603, communication interface system 1607, and user interface system 1609.

Processing system 1608 loads and executes software 1605 from storage system 1603. Software 1605 includes and implements formula process 1606, which is representative of the formula processes discussed with respect to the preceding Figures. When executed by processing system 1608 to enhance the user experience with respect to formulas in spreadsheets, software 1605 directs processing system 1608 to operate as described herein for at least the various processes, operational scenarios, and sequences discussed in the foregoing implementations. Computing system 1601 may optionally include additional devices, features, or functionality not discussed for purposes of brevity.

Referring still to FIG. 16, processing system 1608 may comprise a micro-processor and other circuitry that retrieves and executes software 1605 from storage system 1603. Processing system 1608 may be implemented within a single processing device but may also be distributed across multiple processing devices or sub-systems that cooperate in executing program instructions. Examples of processing system 1608 include general purpose central processing units, graphical processing units, application specific processors, and logic devices, as well as any other type of processing device, combinations, or variations thereof.

Storage system 1603 may comprise any computer readable storage media readable by processing system 1608 and capable of storing software 1605. Storage system 1603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1603 may also include computer readable communication media over which at least some of software 1605 may be communicated internally or externally. Storage system 1603 may be implemented as a single storage device but may also be implemented across multiple storage devices or sub-systems co-located or distributed relative to each other. Storage system 1603 may comprise additional elements, such as a controller, capable of communicating with processing system 1608 or possibly other systems.

Software 1605 (including formula process 1606) may be implemented in program instructions and among other functions may, when executed by processing system 1608, direct processing system 1608 to operate as described with respect to the various operational scenarios, sequences, and processes illustrated herein. For example, software 1605 may include program instructions for implementing a formula process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1605 may include additional processes, programs, or components, such as operating system software, virtualization software, or other application software. Software 1605 may also comprise firmware or some other form of machine-readable processing instructions executable by processing system 1608.

In general, software 1605 may, when loaded into processing system 1608 and executed, transform a suitable apparatus, system, or device (of which computing system 1601 is representative) overall from a general-purpose computing system into a special-purpose computing system customized to provide enhanced formula interactions. Indeed, encoding software 1605 on storage system 1603 may transform the physical structure of storage system 1603. The specific transformation of the physical structure may depend on various factors in different implementations of this description. Examples of such factors may include, but are not limited to, the technology used to implement the storage media of storage system 1603 and whether the computer-storage media are characterized as primary or secondary storage, as well as other factors.

For example, if the computer readable storage media are implemented as semiconductor-based memory, software 1605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
    one or more computer readable storage media;
    one or more processors operatively coupled with the one or more computer readable storage media; and
    program instructions stored on the one or more computer readable media that, when executed by the one or more processors, direct the computing apparatus to at least:
    display at least a portion of a formula in a user interface to a spreadsheet, wherein the portion of the formula comprises a character string;
    identify one or more functions expressed in the character string;
    display a form in the user interface, wherein the form includes fields corresponding to parameters of an active one of the one or more functions expressed in the character string;
    populate the character string at positions corresponding to the parameters of the active one, of the one or more functions, with values entered into the fields of the form; and
    as the active one, of the one or more functions, changes to a newly active function, change the fields in the form to correspond to parameters of the newly active function;
    wherein the newly active function comprises a nested function added by a direct edit of the character string outside of the form; and
    wherein the active one, of the one or more functions, changes to the nested function upon completion of the direct edit of the character string.

2. The computing apparatus of claim 1 wherein:
    a cell of the spreadsheet comprises the portion of the formula; and
    the program instructions further direct the computing apparatus to identify a context of the cell.

3. The computing apparatus of claim 1 wherein the program instructions further direct the computing apparatus to revert the newly active function to a previously active one, of the one or more functions, in response to a deletion of the nested function from the character string.

4. The computing apparatus of claim 3 wherein the program instructions further direct the computing apparatus to change the fields in the form to correspond to parameters of the previously active one, of the one or more functions, in response to the deletion of the nested function.

5. The computing apparatus of claim 4 wherein the form comprises a non-modal form and wherein the program instructions direct the computing apparatus to display the formula within at least one of a cell and a formula bar.

6. The computing apparatus of claim 1 wherein the program instructions further direct the computing apparatus to auto-populate the fields with suggested values.

7. The computing apparatus of claim 6 wherein the program instructions further direct the computing apparatus to obtain the suggested values from a machine learning model.

8. A method comprising:
    displaying at least a portion of a formula in a user interface to a spreadsheet, wherein the portion of the formula comprises a character string;
    identifying one or more functions expressed in the character string;
    displaying a form in the user interface, wherein the form includes fields corresponding to parameters of an active one of the one or more functions expressed in the character string;
    populating the character string at positions corresponding to the parameters of the active one, of the one or more functions, with values entered into the fields of the form; and
    as the active one, of the one or more functions, changes to a newly active function, changing the fields in the form to correspond to parameters of the newly active function;

wherein the newly active function comprises a nested function added by a direct edit of the character string outside of the form; and wherein the active one, of the one or more functions, changes to the nested function upon completion of the direct edit of the character string.

9. The method of claim 8 wherein:

a cell of the spreadsheet comprises the portion of the formula; and the method further comprises identifying a context of the cell.

10. The method of claim 8 further comprising reverting the newly active function to a previously active one, of the one or more functions, in response to a deletion of the nested function from the character string.

11. The method of claim 10 further comprising changing the fields in the form to correspond to parameters of the previously active one, of the one or more functions, in response to the deletion of the nested function.

12. The method of claim 11 wherein the form comprises a non-modal form and wherein the method comprises displaying the formula within at least one of a cell and a formula bar.

13. The method of claim 8 further comprising auto-populating the fields with suggested values.

14. The method of claim 13 further comprising obtaining the suggested values from a machine learning model.

15. A computing apparatus comprising:

one or more computer readable storage media;

a processing system operatively coupled to the one or more computer readable storage media; and program instructions stored on the one or more computer readable storage media that, when executed by the processing system, direct the computing apparatus to at least:

in a user interface layer of an application, receive input comprising text entered into a cell of a spreadsheet;

in a parsing layer of the application, detect a function in the text and identifying the function to the user interface layer;

in the user interface layer, surface a form comprising one or more fields corresponding to one or more parameters of the function;

in the user interface layer, receive subsequent user input comprising subsequent text entered into a field of the form;

in the parsing layer of the application, detect a nested function in the subsequent text and identifying the nested function to the user interface layer; and in the user interface layer, surface one or more fields corresponding to one or more parameters of the nested function.

16. The computing apparatus of claim 15 wherein the program instructions further direct the computing apparatus to:

identify a context of the cell.

17. The computing apparatus of claim 15 wherein the program instructions further direct the computing apparatus to:

receive additional user input comprising additional text entered into the cell of the spreadsheet while the form is displayed; and display the additional text in a one of the one or more fields of the form simultaneously with displaying the additional text in the cell.

18. The computing apparatus of claim 17 wherein the program instructions further direct the computing apparatus to:

in the user interface layer, determine whether an additional field in the form is required to hold the additional text; and in response to determining that the additional field is required, add the additional field to the form and displaying the additional text in the additional field.

19. The computing apparatus of claim 18 wherein the form comprises a non-modal dialog box having the one or more fields included therein and having a format for the function included therein.

20. The computing apparatus of claim 15 wherein the program instructions further direct the computing apparatus to determine a state of the form based on a state of the cell and to determine the state of the cell based on factors comprising a position of a cursor in the cell and the text entered in the cell.

* * * * *